United States Patent
Urano et al.

(10) Patent No.: US 9,560,700 B2
(45) Date of Patent: Jan. 31, 2017

(54) ILLUMINATION LAMP AND ILLUMINATION DEVICE CONFIGURED FOR RAPID-START METHOD

(71) Applicants: Masaharu Urano, Kanagawa (JP); Hiroshi Yamazaki, Chiba (JP)

(72) Inventors: Masaharu Urano, Kanagawa (JP); Hiroshi Yamazaki, Chiba (JP)

(73) Assignees: RICOH COMPANY, LTD., Tokyo (JP); O2 MICRO, INCORPORATED, Santa Clara, CA (US)

( * ) Notice: Subject to any disclaimer, the term of this patent is extended or adjusted under 35 U.S.C. 154(b) by 0 days.

(21) Appl. No.: 14/880,674

(22) Filed: Oct. 12, 2015

(65) Prior Publication Data

US 2016/0119991 A1    Apr. 28, 2016

(30) Foreign Application Priority Data

Oct. 23, 2014  (JP) .................................. 2014-216694

(51) Int. Cl.
*H05B 33/08* (2006.01)
*F21Y 101/00* (2016.01)

(52) U.S. Cl.
CPC ............ *H05B 33/0803* (2013.01); *F21K 9/27* (2016.08); *F21Y 2101/00* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

| 2014/0035463 A1* | 2/2014 | Miyamichi | H05B 33/0815 315/127 |
| 2014/0062320 A1 | 3/2014 | Urano et al. | |
| 2014/0152184 A1 | 6/2014 | Tomiyama et al. | |

(Continued)

FOREIGN PATENT DOCUMENTS

| JP | 2008-277188 | 11/2008 |
| JP | 5108994 | 10/2012 |

(Continued)

OTHER PUBLICATIONS

Apr. 21, 2016 United Kingdom official action in connection with United Kingdom patent application No. GB1518580.4.

*Primary Examiner* — Dedei K Hammond
(74) *Attorney, Agent, or Firm* — Cooper & Dunham LLP

(57) ABSTRACT

An illumination lamp includes: an input portion connectable to any one of power supply portions for two or more starting methods including a rapid-start method; a voltage detection circuit configured to detect a voltage applied from a power supply portion; and a control portion including at least one first voltage supply portion configured to supply a voltage suitably for the rapid-start method to a semiconductor light-emitting device, and at least one second voltage supply portion configured to supply a voltage suitably for the other fluorescent-lamp starting method to the semiconductor light-emitting device. The control portion causes, if the voltage is detected by the voltage detection circuit, the first voltage supply portion to supply a voltage to the semiconductor light-emitting device, but causing, if the voltage is not detected by the voltage detection circuit, the second voltage supply portion to supply a voltage to the semiconductor light-emitting device.

6 Claims, 14 Drawing Sheets

(56) References Cited

U.S. PATENT DOCUMENTS

2014/0306615 A1    10/2014  Choi et al.

FOREIGN PATENT DOCUMENTS

| | | | |
|---|---|---|---|
| JP | 2012204086 A | * | 10/2012 |
| JP | 2014-049283 | | 3/2014 |
| JP | 2014-056729 | | 3/2014 |
| JP | 2015-179655 | | 10/2015 |
| WO | WO 2012/052875 A2 | | 4/2012 |

* cited by examiner

WIDTH DIRECTION

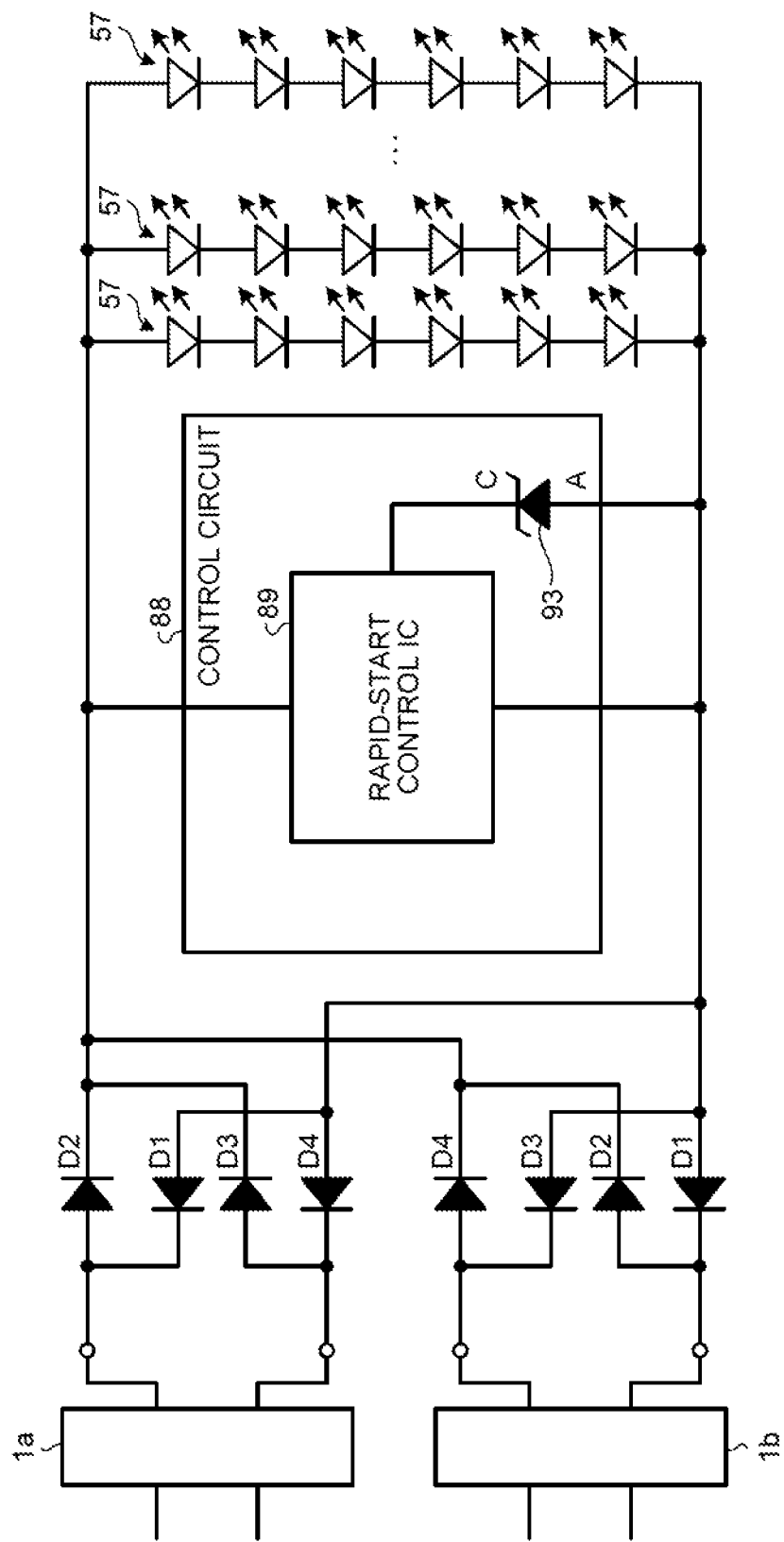

ILLUMINATION LAMP AND ILLUMINATION DEVICE CONFIGURED FOR RAPID-START METHOD

CROSS-REFERENCE TO RELATED APPLICATIONS

The present application claims priority to and incorporates by reference the entire contents of Japanese Patent Application No. 2014-216694 filed in Japan on Oct. 23, 2014.

BACKGROUND OF THE INVENTION

1. Field of the Invention

The present invention relates to an illumination lamp and an illumination device.

2. Description of the Related Art

In recent years, illumination lamps (hereinafter, sometimes referred to as "LED illumination lamps") using LEDs (light-emitting diodes) characterized by low power consumption, long life, and the like have attracted much attention. Some type of such LED illumination lamps operates on commercial alternating-current (AC) power or on output of a fluorescent-lamp ballast of various types and can be replacement of conventional fluorescent lamps.

However, if general constant-current control is applied to LED illumination lamps mounted in a dual-fluorescent-lamp lamp fixture containing a rapid-start fluorescent-lamp ballast, a problem that the LED illumination lamps become unequal (unbalanced) in light output intensity can occur.

In view of the above, there is a need to provide an illumination lamp and an illumination device that allow a plurality of LED illumination lamps mounted in a lamp fixture containing a rapid-start ballast to light up with more equal light output intensities and an illumination device including the LED illumination lamps.

SUMMARY OF THE INVENTION

It is an object of the present invention to at least partially solve the problems in the conventional technology.

An illumination lamp includes: an input portion connectable to any one of power supply portions for two or more starting methods including a method using a fluorescent-lamp ballast for a rapid-start method; a semiconductor light-emitting device; a voltage detection circuit configured to detect a voltage applied from a power supply portion; and a control portion including at least one first voltage supply portion for the rapid-start method, the first voltage supply portion being configured to supply a voltage suitably for the rapid-start method to the semiconductor light-emitting device, and at least one second voltage supply portion configured to supply a voltage suitably for the other fluorescent-lamp starting method to the semiconductor light-emitting device. The control portion causes, if the voltage is detected by the voltage detection circuit, the first voltage supply portion to supply a voltage to the semiconductor light-emitting device, but causing, if the voltage is not detected by the voltage detection circuit, the second voltage supply portion to supply a voltage to the semiconductor light-emitting device.

An illumination lamp includes: an input portion connectable to a power supply portion of a fluorescent-lamp ballast for a rapid-start method; a semiconductor light-emitting device; a control portion including at least one voltage supply portion for the rapid-start method, the voltage supply portion being configured to supply a voltage suitably for the rapid-start method, the control portion generating a voltage to be supplied by the voltage supply portion to the semiconductor light-emitting device by a switching operation in which the voltage corresponding to an ON period of the voltage supply portion is generated; and a switching control element configured to control the ON period in the switching operation of the voltage supply portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a block diagram of an illumination lamp of a third embodiment.

DETAILED DESCRIPTION OF THE PREFERRED EMBODIMENTS

Exemplary embodiments of the present invention are described in detail below with reference to the accompanying drawings.

First Embodiment

Figure 1:
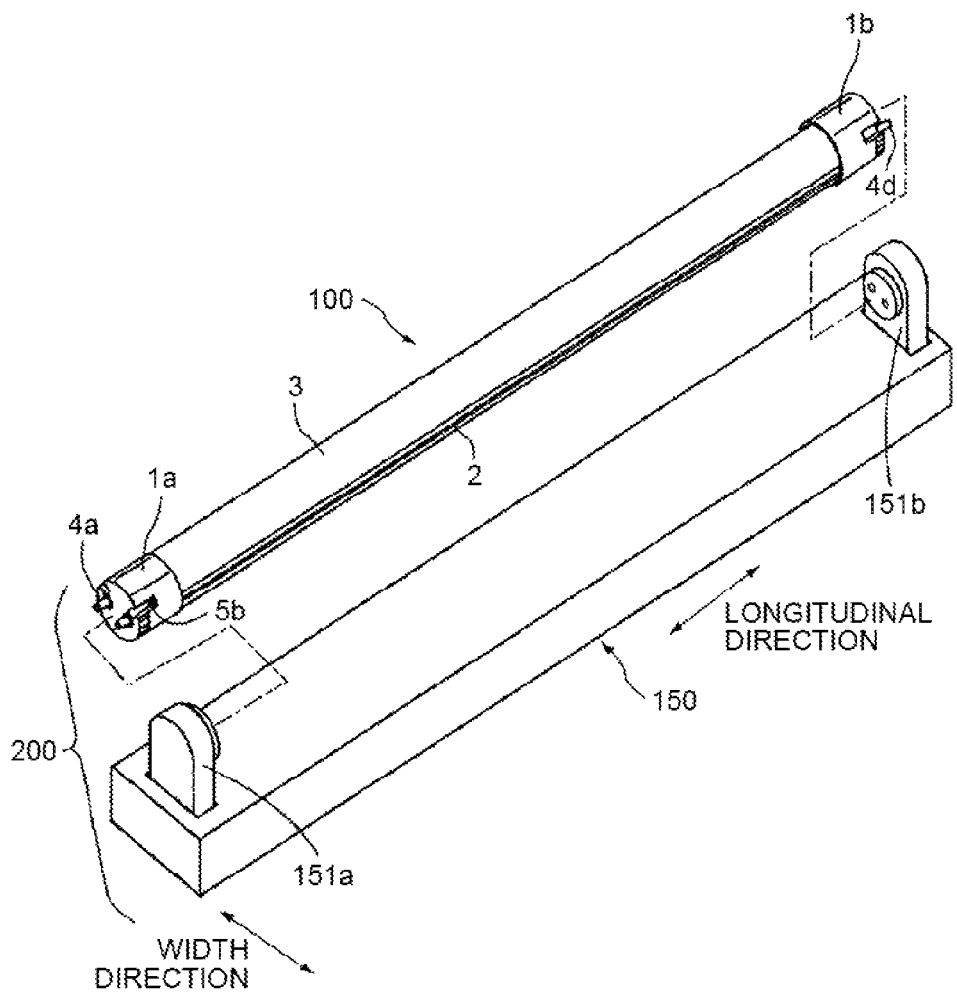
FIG. 1 is a perspective exterior view of an illumination device including an illumination lamp according to a first embodiment and a lamp fixture where the illumination lamp is to be mounted.

FIG. 1 is a perspective exterior view of an illumination device including an illumination lamp according to a first embodiment and a lamp fixture in which the illumination lamp is to be mounted. Referring to FIG. 1, an illumination device 200 includes an illumination lamp 100 and a lamp fixture 150 in which the illumination lamp 100 is to be mounted.

The illumination lamp 100 includes cap members 1a and 1b, a housing 2, and a translucent member 3. The housing 2 has an elongated shape formed by extruding a metal member of, for example, an aluminum alloy or a magnesium alloy. The housing 2 is shaped so as to have an approximately semi-cylindrical cross section. The translucent member 3 also has an elongated, approximately semi-cylindrical shape which assumes an approximately cylindrical shape when combined with the housing 2. The translucent member 3 is made of resin or glass so as to allow luminous flux emitted from a plurality of LEDs, which will be described later, to pass through the translucent member 3.

The cap members 1a and 1b, each having a closed-end cylindrical shape, function as caps on the both ends of the housing 2 and the translucent member 3. Furthermore, the cap members 1a and 1b are attached to sockets 151a and 151b of the lamp fixture 150, thereby providing physical and electrical connections between the lamp fixture 150 and the illumination lamp 100. Note that although the housing 2 has the approximately semi-cylindrical shape in this example, the shape is not limited to an approximately semi-cylindrical shape. Although the translucent member 3 is depicted as being semi-circular, the fluorescent lamp may be configured to have a cylindrical cross section so that the translucent member 3 covers the housing 2.

Figure 2:
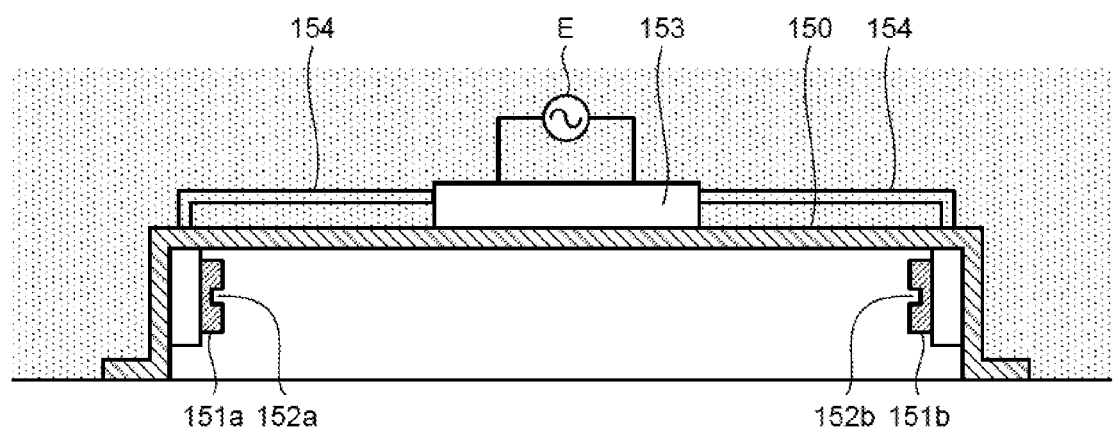
FIG. 2 is a longitudinal cross-sectional view of the lamp fixture.

FIG. 2 is a longitudinal cross-sectional view of the lamp fixture 150. The lamp fixture 150 includes a fluorescent-lamp ballast 153 and the sockets 151a and 151b to which the illumination lamp 100 is to be removably attached. The lamp fixture 150 is configured to be connectable to a commercial AC power supply. The frequency of the commercial AC power supply may be, for example, 50 Hz or 60 Hz. Electric power is supplied from the commercial AC power supply to the fluorescent-lamp ballast 153.

As illustrated in FIG. 2, a portion of the lamp fixture 150 on the side opposite to the sockets 151a and 151b is embedded in a ceiling, for example, but is open on the side of the sockets 151a and 151b. The sockets 151a and 151b are connected to the fluorescent-lamp ballast 153 via a pair of electrode terminals 152a and 152b and wires 154. Examples of the fluorescent-lamp ballast 153 include known ballasts such as a glow-starter fluorescent-lamp ballast, a rapid-start fluorescent-lamp ballast, and an inverter fluorescent-lamp ballast. It should be noted that the illumination lamp 100 is configured to be directly connectable to the commercial AC power supply and, in this case, the fluorescent-lamp ballast 153 is unnecessary. The illumination lamp 100 can be configured to be connectable to any one of a glow-starter fluorescent-lamp ballast, a rapid-start fluorescent-lamp ballast, an inverter fluorescent-lamp ballast, and the commercial AC power supply in this manner.

Figure 3A:
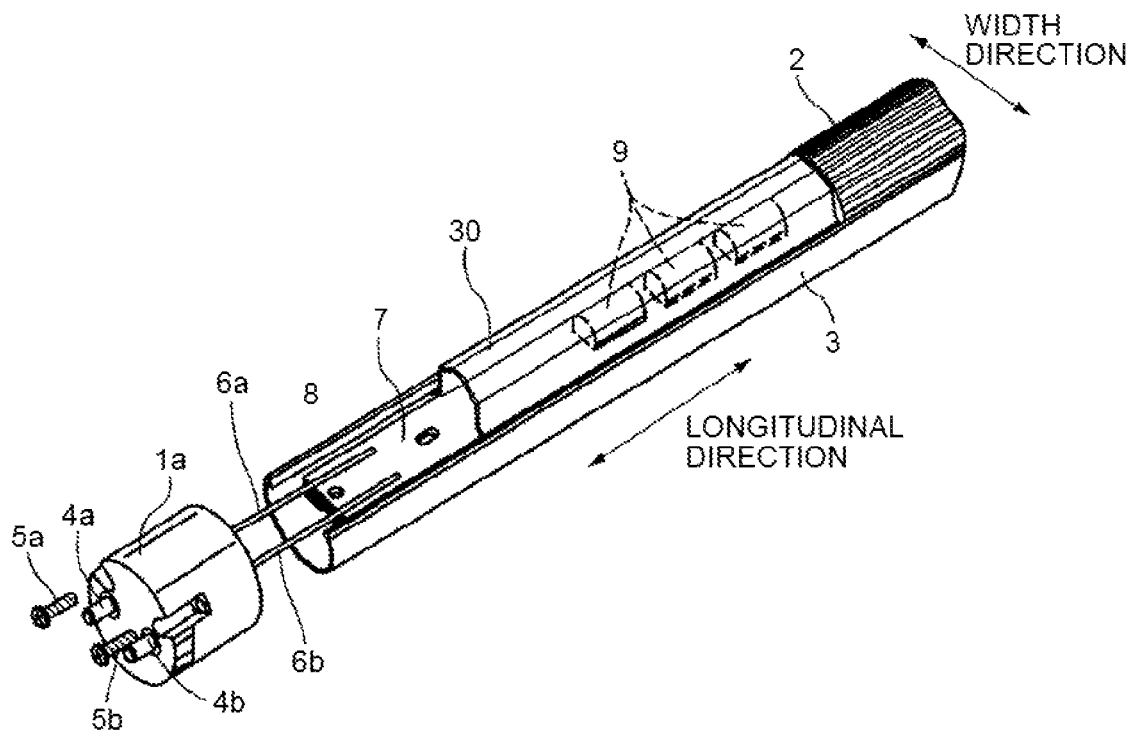
FIGS. 3A and 3B are exploded perspective views of the illumination lamp of the first embodiment.
Figure 3B:
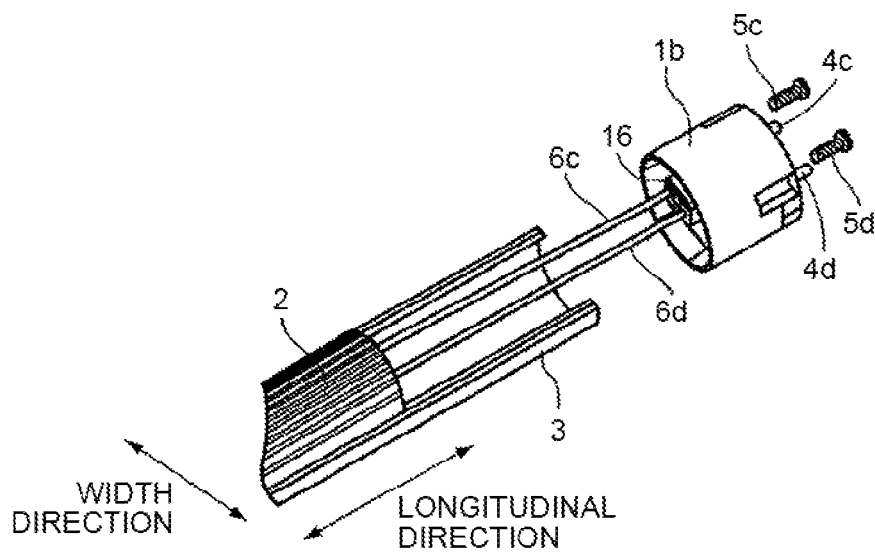

FIGS. 3A and 3B are exploded perspective views of the illumination lamp 100. FIG. 3A is an exploded perspective view of a left-end portion in the longitudinal direction of the illumination lamp 100. FIG. 3B is an exploded perspective view of a right-end portion of the illumination lamp 100 in the longitudinal direction. As illustrated in FIGS. 3A and 3B, the cap members 1a and 1b are fastened to the housing 2 with a plurality of screws 5a, 5b, 5c, and 5d. By being fastened in this manner, the cap members 1a and 1b shroud the housing 2 and the translucent member 3 fitted into the housing 2, thereby integrating the housing 2 with the translucent member 3. In short, the cap members 1a and 1b are formed and disposed so as to cover the both ends of the housing 2 and the translucent member 3.

The cap members 1a and 1b may alternatively be constructed by, rather than being fastened with the screws, being closely fitted (caulked) at a joint between the cap members 1a and 1b and the housing 2 with a tool or the like or, further alternatively, formed by insert molding. The cap members 1a and 1b are substantially identical in shape with cap members (bases) on both ends of an existing fluorescent lamp. The illumination lamp 100 is thus configured to allow easy replacement with an existing fluorescent lamp mounted in the lamp fixture 150.

As illustrated in FIGS. 3A to 4B, electrode terminals 4a and 4b are installed on the cap member 1a, which is one of the cap members, so as to longitudinally protrude from the cap member 1a; electrode terminals 4c and 4d are installed on the cap member 1b, which is the other one of the cap members, so as to longitudinally protrude from the cap member 1b. The electrode terminals 4a, 4b, 4c, and 4d may be installed on the cap member 1a and the cap member 1b by a fixing method such as insert molding, caulking, or screw fastening. As illustrated in FIG. 3B, the illumination lamp 100 receives AC power supply from a commercial power supply E via connectors 16 placed in the cap members 1a and 1b. The received AC power is supplied to a power supply board 7 illustrated in FIG. 3A via lead wires 6a, 6b, 6c, and 6d.

Figure 4A:
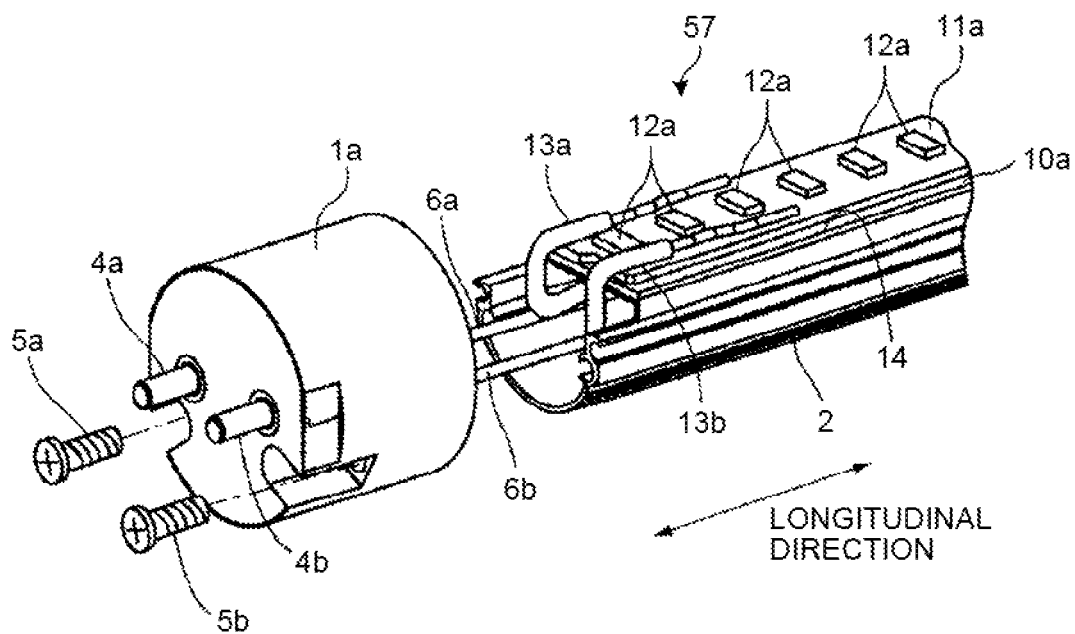
FIGS. 4A and 4B are exploded perspective views of both end portions of the illumination lamp of the first embodiment.
Figure 4B:
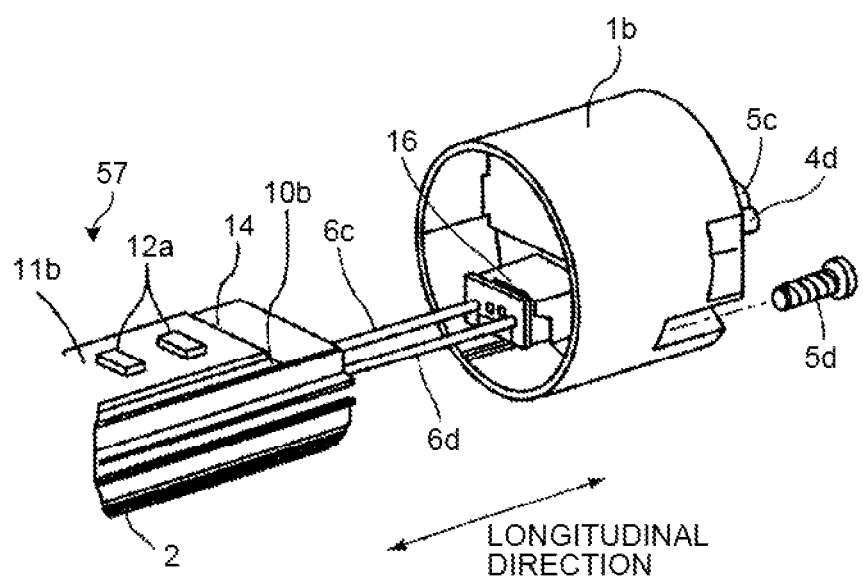

Electronic components 9 for rectification or, more specifically, for converting the AC power supply received from the commercial power supply E into DC (direct-current) power supply to supply the converted power supply to mounting boards 11a and 11b are disposed on the power supply board 7. As illustrated in FIGS. 4A and 4B, an LED module 57 where a plurality of longitudinally-arranged LEDs 12a is mounted is disposed on the mounting boards 11a and 11b. LED is an example of a semiconductor light-emitting device. LED is an abbreviation for light-emitting diode. As illustrated in FIG. 3A, the power supply board 7 is housed in the housing 2 having the approximately semi-cylindrical shape and fixed so as not to move in the housing 2. In the illumination lamp 100 of the first embodiment, the lead wires 6a and 6b are shorter than the lead wires 6c and 6d.

An electric current rectified into DC by the electronic components 9 is supplied to the mounting boards 11a and 11b via lead wires 13a and 13b illustrated in FIG. 4A. The mounting boards 11a and 11b, which are longitudinally arranged parallel to each other, are mutually electrically connected via a lead wire, a jumper wire, or the like (not shown). Although the LED module 57 is mounted on the two mounting boards (11a and 11b) in the illustrated example, the LED module 57 may be mounted on a single mounting board or three or more mounting boards.

As illustrated in FIG. 3A to 4B, in the illumination lamp 100 of the first embodiment, the power supply board 7 is placed under the mounting board 11a, while nothing is placed at the mounting board 11b. Put another way, the structure at the mounting board 11b is planar so that has an internal space is in the housing 2. The mounting boards 11a and 11b are mounted on a flat portion 14 which corresponds to a chord of a semi-circle of the housing 2. Sheet-like resin members 10a and 10b are disposed between the flat portion 14 and the mounting boards 11a and 11b, respectively, such that the resin member 10a and the resin member 10b are sandwiched between the flat portion 14 and the mounting board 11a and between the flat portion 14 and the mounting board 11b, respectively.

Figure 5:
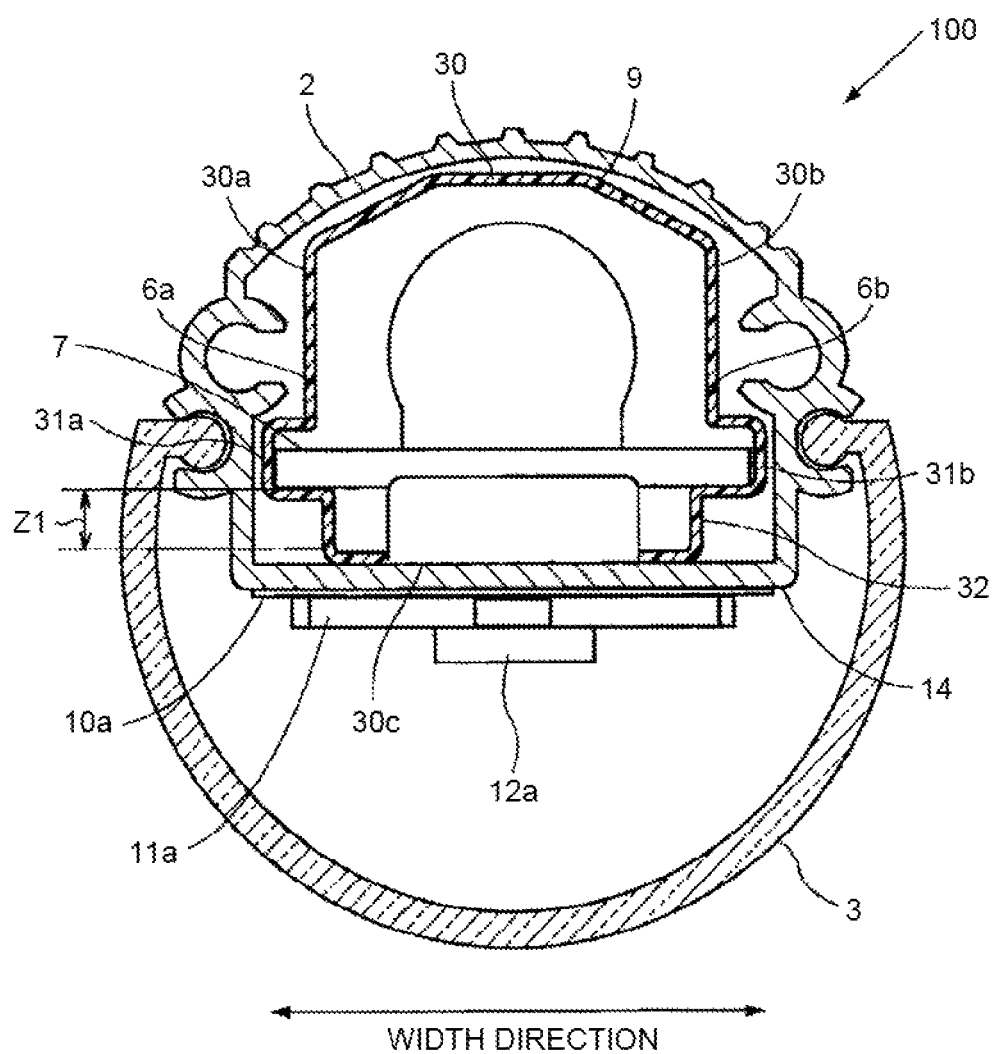
FIG. 5 is a transverse cross-sectional view of the illumination lamp of the first embodiment.

The lead wires 6a and 6b and the lead wires 6c and 6d are connected to the one end and the other end, respectively, of the power supply board 7 as illustrated in FIG. 3A to 4B. The power supply board 7 is surrounded by a holder 30, which is a cover member extending in the longitudinal direction and made of resin, as illustrated in FIG. 5. Bases to be inserted to the connectors 16 are disposed on distal ends of the lead wires 6a and 6b and on distal ends of the lead wires 6c and 6d. The holder 30 is a circumferentially-closed sleeve-like component having an elongated shape approximately as long as the power supply board 7 or longer and having no cut line in the cross section. The holder 30 may be formed by a molding method such as extrusion molding, pultrusion molding, or injection molding. Examples of the material of the holder 30 include PC (polycarbonate) and PA (nylon).

As illustrated in FIG. 5, the holder 30 is configured so as to be housed inside the housing 2 and have a substantially uniform cross section in the longitudinal direction. The power supply board 7 is integrated with the holder 30 by being removably attached to the holder 30.

More specifically, as illustrated in FIG. 5, receiving supports 31a and 31b protruding in a width direction intersecting the longitudinal direction of the holder 30 are formed on side surfaces 30a and 30b of the holder 30 located in the width direction. The receiving supports 31a and 31b function as guide rail portions that guide the power supply board 7 when the power supply board 7 is inserted into the holder 30 from an end. After the power supply board 7 has been inserted, the receiving supports 31a and 31b support the power supply board 7 such that a spacing portion (space portion) 32 is provided between the power supply board 7 and a bottom portion 30c of the holder 30. The spacing portion 32 is provided to provide a distance Z1 that prevents the lead wires of the electronic components 9, which are illustrated in FIG. 3A and projecting out from the power supply board 7, from contacting the holder 30 or provides electrical insulation.

The holder 30 externally covers (surrounds) the entire power supply board 7, thereby spacing the power supply board 7 from the housing 2 in the housing 2. As illustrated in FIG. 5, the holder 30 is in contact with inner side surfaces of the housing 2. To facilitate sliding the holder 30 in the housing 2, the holder 30 has smooth surfaces where the holder 30 contacts the inner side surfaces of the housing 2. In this example, the holder 30 has the closed cross section having no cut line that allows dividing the holder 30. Accordingly, the power supply board 7 is to be installed in the holder 30 by being inserted into the holder 30 from an open end of the holder 30. Prior to being mounted in the housing 2, the holder 30 and the power supply board 7 are integrated into a power-supply board unit and inserted into the housing 2 as the power-supply board unit from the end of the housing 2.

In the structure as described above, because the holder 30 that shrouds the power supply board 7, spaces the power supply board 7 from the housing 2, can be housed in the housing 2, has a substantially uniform cross section, extends in the longitudinal direction and made of resin is included, electrical insulation from the housing 2 can be maintained and thus a high level of safety can be secured. Furthermore, because the need of applying insulation-material coating to the inner surface of the housing to achieve electrical insulation is eliminated, the housing 2 can be manufactured inexpensively. Furthermore, because the holder 30 partitions inner space of the housing 2 to separate between the power supply board 7 and the housing 2, even though the lead wires 13a and 13b of the electronic components 9 protrude, the lead wires 13a and 13b are protected from contacting the housing 2. As a result, the manufacture is possible without using an expensive component such as a chip component.

Furthermore, in the illumination lamp 100 of the first embodiment, the holder 30 (more specifically, the bottom portion 30c of the holder 30) disposed between the power supply board 7 and the mounting boards 11a and 11b makes heat radiating from the power supply board 7 less likely to be conducted to the mounting boards 11a and 11b. As a result, thermal influence is exerted equally on all the LEDs of the LED module 57. Accordingly, an undesirable situation that some of the LEDs reach their respective ends of usable life earlier than the others can be prevented.

Furthermore, the frictional drag that is reduced by the smooth contact surfaces of the holder 30 integrated with the power supply board 7 allows the power-supply board unit to slide inside the housing 2. Accordingly, the work of fitting the connectors 16 into bases on the both ends is facilitated.

Because the holder 30 has the closed cross section with no cut line therein, the chance of contact between the electronic components 9 and the housing 2 is eliminated. As a result, electrical insulation between the electronic components 9 and the housing 2 is maintained, and a high level of security is ensured. Furthermore, because the need of applying coating to the inner surface of the housing 2 to provide electrical insulation is eliminated, the housing 2 can be manufactured inexpensively.

Figure 6:
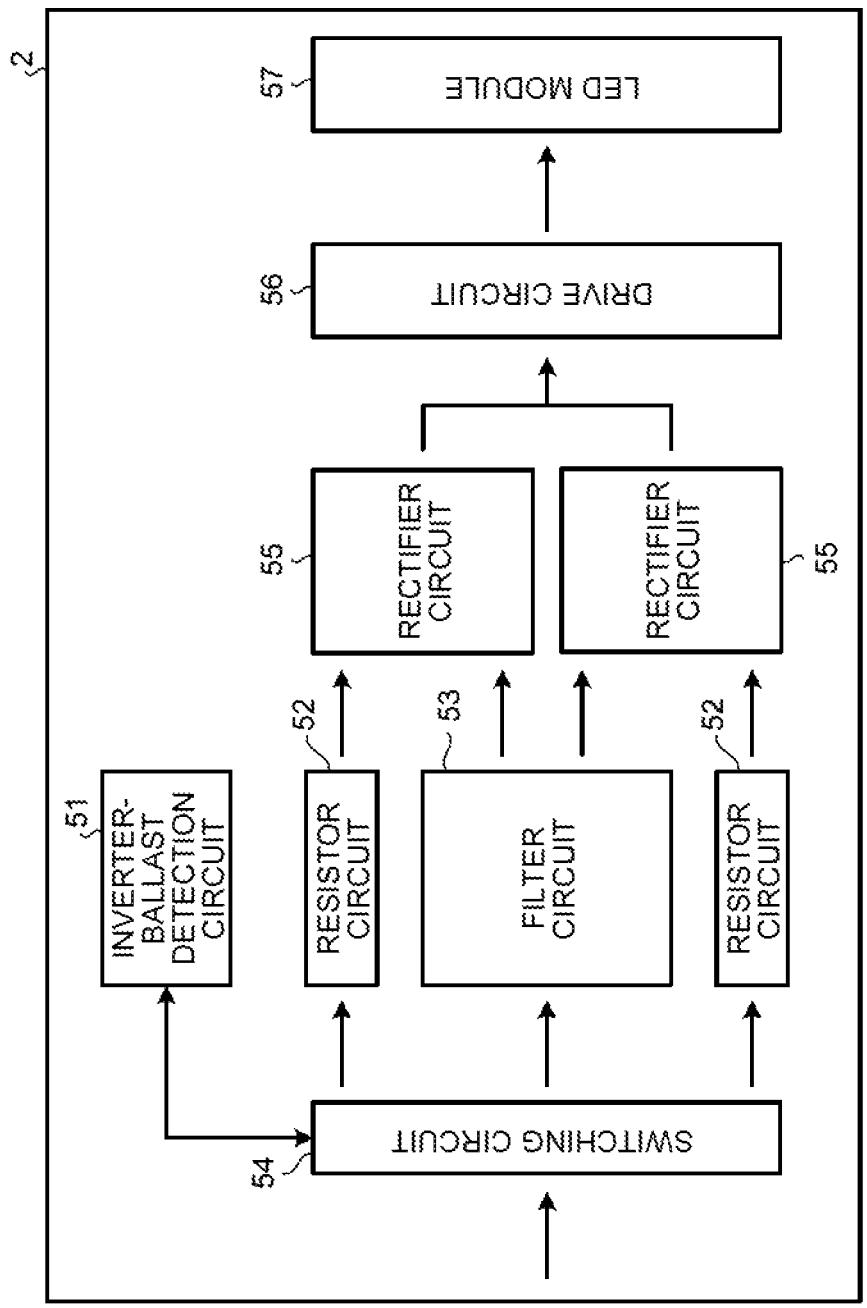
FIG. 6 is a block diagram of the illumination lamp of the first embodiment.

FIG. 6 is a block diagram of circuits disposed on the mounting boards 11a and 11b and the power supply board 7 of the illumination lamp 100. The board illustrated in FIG. 6 is what is generally referred to as "LED driver board". The LED driver board includes, as relevant elements, an inverter-ballast detection circuit 51, resistor circuits 52, a filter circuit 53, switching circuits 54, rectifier circuits 55, a drive circuit 56, and the LED module 57.

The inverter-ballast detection circuit 51 detects whether the illumination lamp 100 is mounted in an inverter-type lamp fixture. Each of the resistor circuits 52 creates an impedance corresponding to a filament of a fluorescent lamp. In the illustrated example, each of the resistor circuits 52, which will be described later, is a circuit in which a resistor and a capacitor are parallel-connected to create an impedance corresponding to a filament. An inductor is series-connected to the parallel circuit of the resistor and the capacitor. As the inductor, for example, a ferrite bead maybe used to remove noise to thereby increase an inverter light-on ratio during when the illumination lamp 100 is mounted in an inverter-type lamp fixture.

The filter circuit 53 is an EMI filter provided to reduce electromagnetic noise propagating from the illumination lamp 100 to the surroundings. EMI is an abbreviation for electromagnetic interference. A circuit (not shown) in which a line-to-line capacitor (X-capacitor), a line-to-ground capacitor (Y-capacitor), a common-mode coil, a normal-mode coil, and the like are connected in series or parallel, for example, can be used as the filter circuit 53.

The filter circuit 53 allows the illumination lamp 100 to be reduced in electromagnetic noise and satisfying a standard for EMI. Each of the switching circuits 54 can be a relay or a semiconductor switch (e.g., an FET (field-effect transistor)), for example. The switching circuits 54 cut off power supply to the resistor circuits 52 when the illumination lamp 100 is mounted in a direct-AC-supply lamp fixture, a glow-starter-type lamp fixture, or a rapid-start-type lamp fixture. Put another way, the switching circuits 54 supply power to the resistor circuits 52 when the illumination lamp 100 is mounted in an inverter-type lamp fixture.

The filter circuit 53 may be configured to be bypassable using the switching circuits 54. More specifically, the switching circuits 54 may be configured to connect the filter circuit 53 to a power supply wire when the illumination lamp 100 is mounted in any one of a glow-starter fluorescent-lamp ballast, a rapid-start fluorescent-lamp ballast, and the commercial AC power supply. The power supply wire is a wire for supplying power supply received from any one of the commercial AC power supply, a rapid-start fluorescent-lamp ballast, a glow-starter fluorescent-lamp ballast, and an inverter fluorescent-lamp ballast. Put another way, the switching circuits 54 disconnect the filter circuit 53 from the power supply wire when the illumination lamp 100 is mounted in an inverter-type lamp fixture. Note that this does not apply to a configuration where the filter circuit 53 is not provided as will be described later with reference to FIG. 13.

The rectifier circuit 55 is a full-wave rectifier circuit formed by, for example, connecting four rectifier diodes (D1 to D4) in a diode-bridge arrangement. The drive circuit 56 includes a current-monitoring resistor for monitoring an electric current, a switching element, and a control IC.

The drive circuit 56 drives the LED module 57 including the plurality of light-emitting diodes (LEDs). The drive circuit 56 may include, for example, a step-up/down circuit and a constant-current circuit. The drive circuit 56 allows supplying an appropriate amount of electric current not exceeding a rated current to the LED module 57 even if the voltage supplied from the rectifier circuit 55 varies, thereby preventing a failure of the LED module 57 and achieving power saving.

The illumination lamp 100 is connectable to any one of power supply portions or, more specifically, to any one of a glow-starter fluorescent-lamp ballast, a rapid-start fluorescent-lamp ballast, an inverter fluorescent-lamp ballast, and the commercial AC power supply. The illumination lamp 100 is configured such that the circuit to be used is selectable depending on to which one of the power supply portions the illumination lamp 100 is connected. The inverter-ballast detection circuit 51 is a detection circuit that detects a method of the power supply portion connected to an input portion.

The inverter-ballast detection circuit 51 detects, when the illumination lamp 100 is energized by being connected to the lamp fixture 150, whether or not the fluorescent-lamp ballast 153 contained in the lamp fixture 150 is an inverter fluorescent-lamp ballast. If the fluorescent-lamp ballast 153 is an inverter fluorescent-lamp ballast, frequency of signals fed from the fluorescent-lamp ballast 153 to the illumination lamp 100 is high (approximately a few tens of kHz).

On the other hand, if the fluorescent-lamp ballast 153 is any one of a glow-starter fluorescent-lamp ballast, a rapid-start fluorescent-lamp ballast, and the commercial AC power supply, frequency of signals fed from the fluorescent-lamp ballast 153 (or directly from the commercial AC power supply) to the illumination lamp 100 is low (approximately 50 to 60 kHz). Hence, the inverter-ballast detection circuit 51 can detect whether or not the fluorescent-lamp ballast 153 contained in the lamp fixture 150 is an inverter fluorescent-lamp ballast based on, for example, the frequency of the signals fed to the illumination lamp 100.

If the inverter-ballast detection circuit 51 detects that the fluorescent-lamp ballast 153 contained in the lamp fixture 100 is an inverter fluorescent-lamp ballast, the filter circuit 53 is bypassed using the switching circuits 54.

Figure 7:
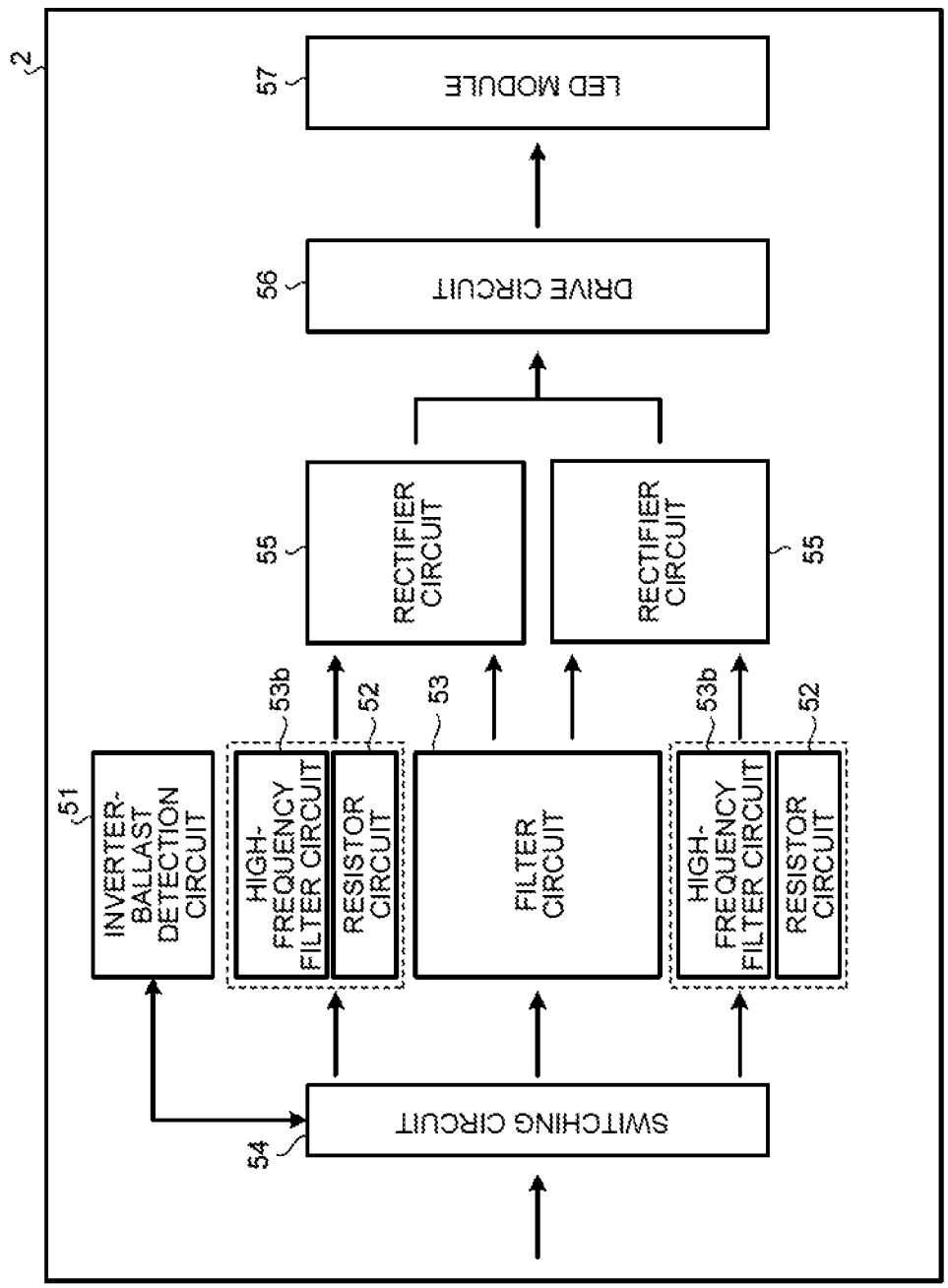
FIG. 7 is a block diagram of a modification of the illumination lamp of the first embodiment, where the illumination lamp includes high-frequency filter circuits in addition to a filter circuit.

The illumination lamp 100 may be modified to include high-frequency filter circuits 53b in addition to the filter circuit 53 as illustrated in FIG. 7. This modification may be configured such that, if the inverter-ballast detection circuit 51 detects that the fluorescent-lamp ballast 153 contained in the lamp fixture 150 is an inverter fluorescent-lamp ballast, the switching circuits 54 cause signals to pass through the high-frequency filter circuits 53b. With this modification, even if the filter circuit 53 and the drive circuit 56 are bypassed, the EMI noise problem can be prevented. Furthermore, an appropriate amount of electric current not exceeding the rated current can be supplied to the LED module 57. The fluorescent-lamp ballast 153 may be configured to have a function equivalent to the filter circuit 53.

Figure 8:
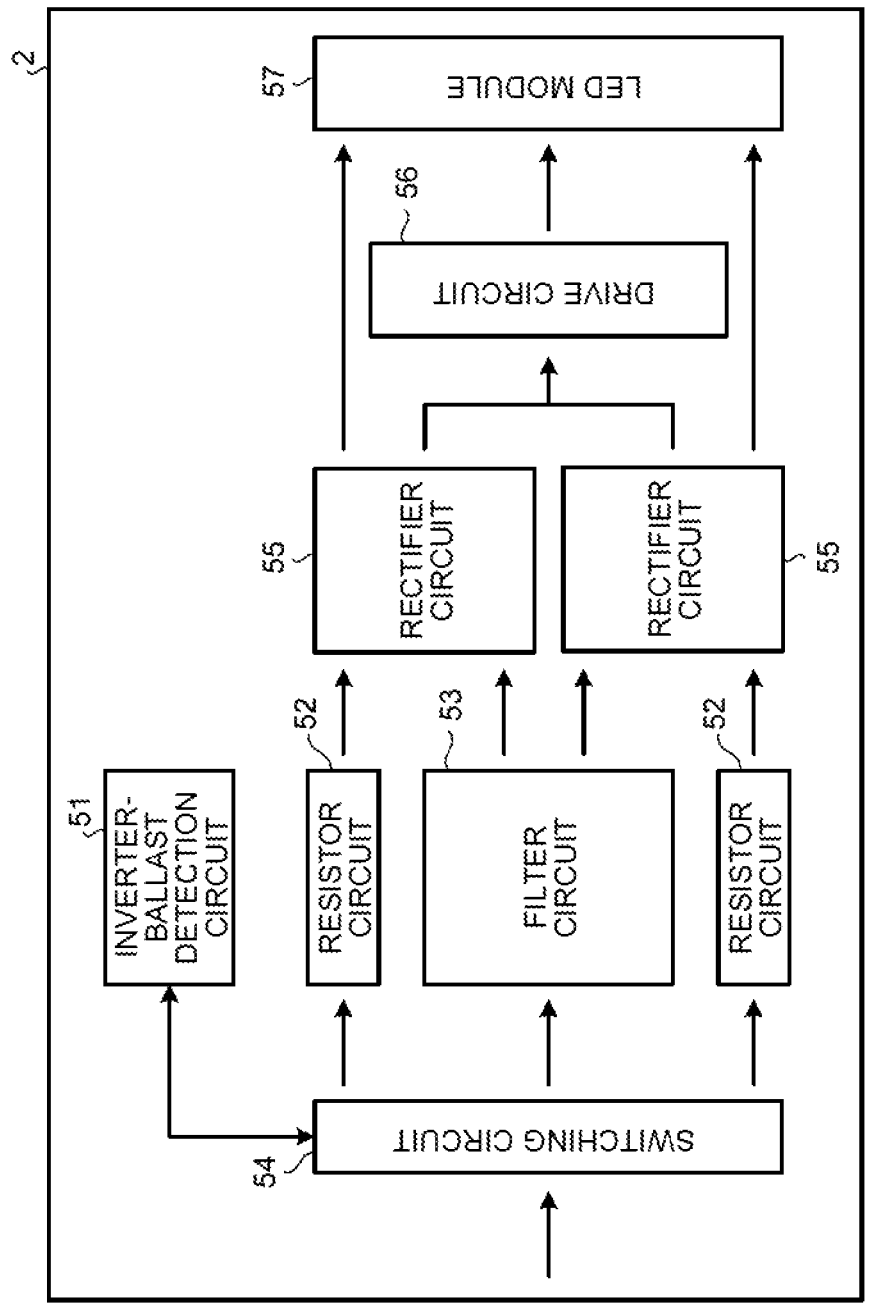
FIG. 8 is a block diagram of a modification of the illumination lamp of the first embodiment, where a drive circuit can be bypassed.

The illumination lamp 100 may be modified such that the drive circuit 56 is bypassable using the switching circuits 54 as illustrated in FIG. 8. Each of the switching circuits 54 can be a relay or a semiconductor switch (e.g., an FET), for example. If the filter circuit 53 is bypassed using the switching circuits 54, outputs of the rectifier circuits 55 are supplied to the LED module 57 by bypassing the drive circuit 56. The illumination lamp 100 of this modification illustrated in FIG. 8 may also be configured such that, if the inverter-ballast detection circuit 51 detects that the fluorescent-lamp ballast 153 contained in the lamp fixture 150 is an inverter fluorescent-lamp ballast, the switching circuits 54 cause signals to pass through the high-frequency filter circuits 53b.

Figure 9:
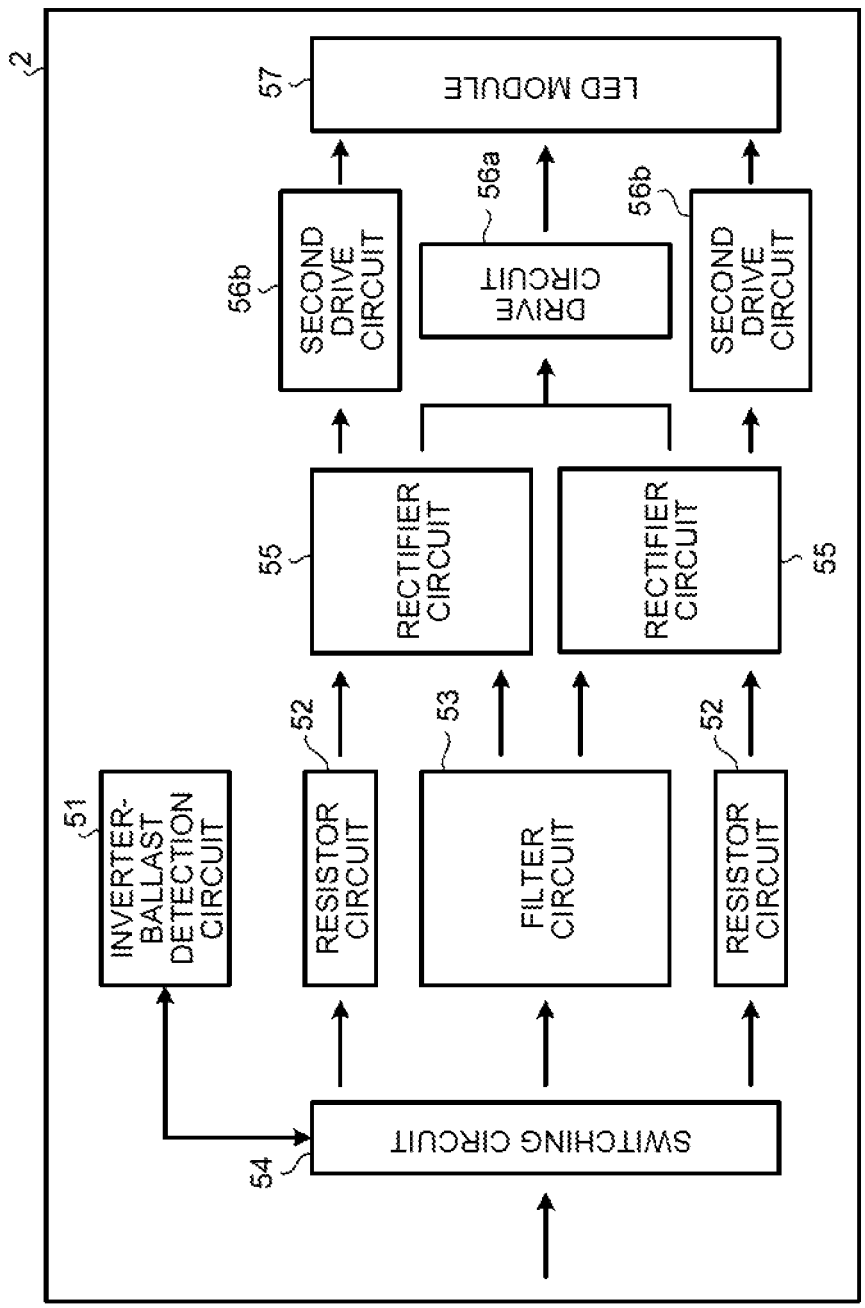
FIG. 9 is a block diagram of a modification of the illumination lamp of the first embodiment, where the illumination lamp includes second drive circuits in addition to a drive circuit.

The illumination lamp 100 may be modified to include second drive circuits 56b in addition to a drive circuit 56a as illustrated in FIG. 9. This modification may be configured such that, if the inverter-ballast detection circuit 51 detects that the fluorescent-lamp ballast 153 contained in the lamp fixture 150 is an inverter fluorescent-lamp ballast, the switching circuits 54 cause signals to pass through the high-frequency filter circuits 53b.

Figure 10:
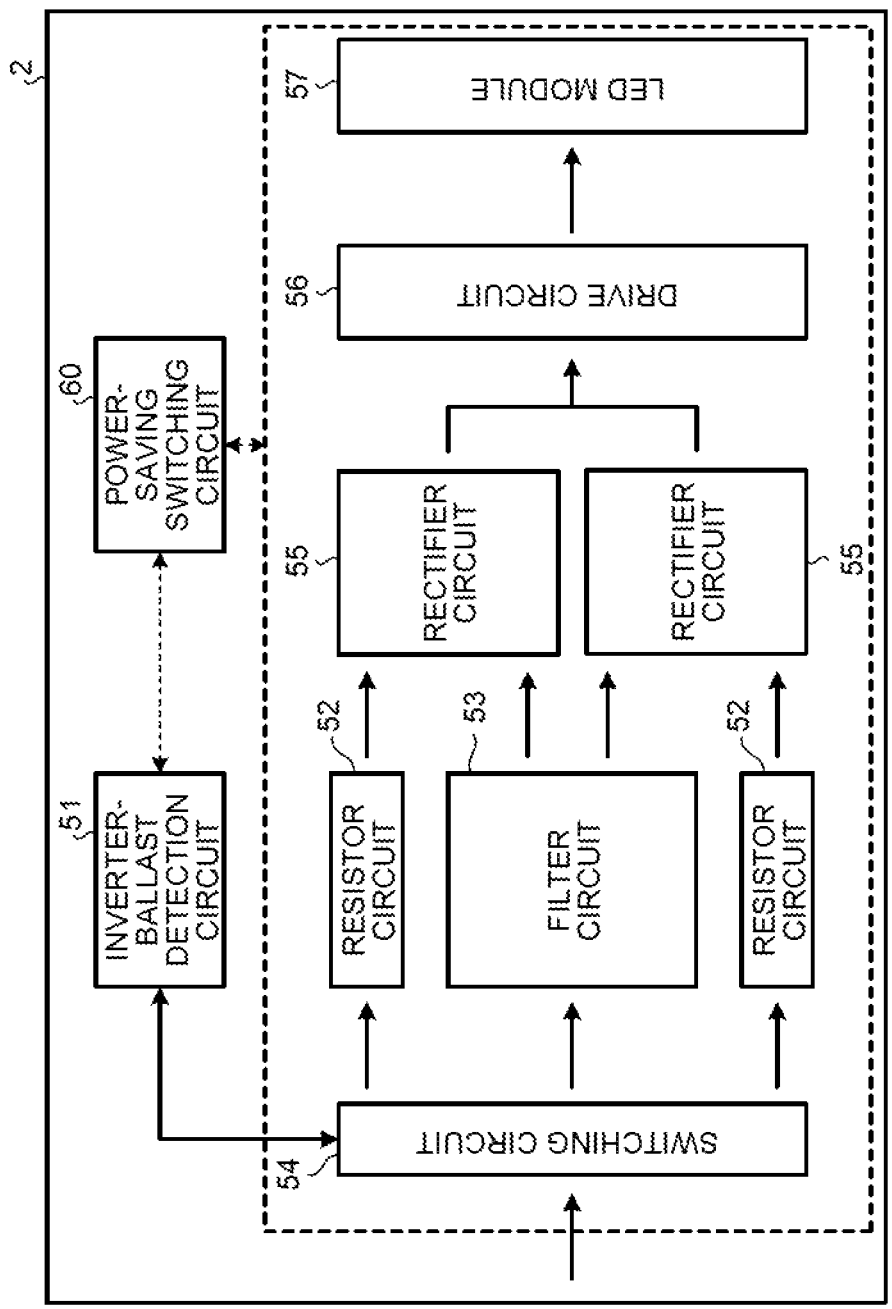
FIG. 10 is a block diagram of a modification of the illumination lamp of the first embodiment, where the illumination lamp includes a power-saving switching circuit.

The illumination lamp 100 may be modified to include a power-saving switching circuit 60 as illustrated in FIG. 10. The power-saving switching circuit 60 switches an operation mode of the illumination lamp 100 to a predetermined power-saving mode when the illumination lamp 100 is mounted in an inverter-type lamp fixture and a timer reaches preset time.

Figure 11:
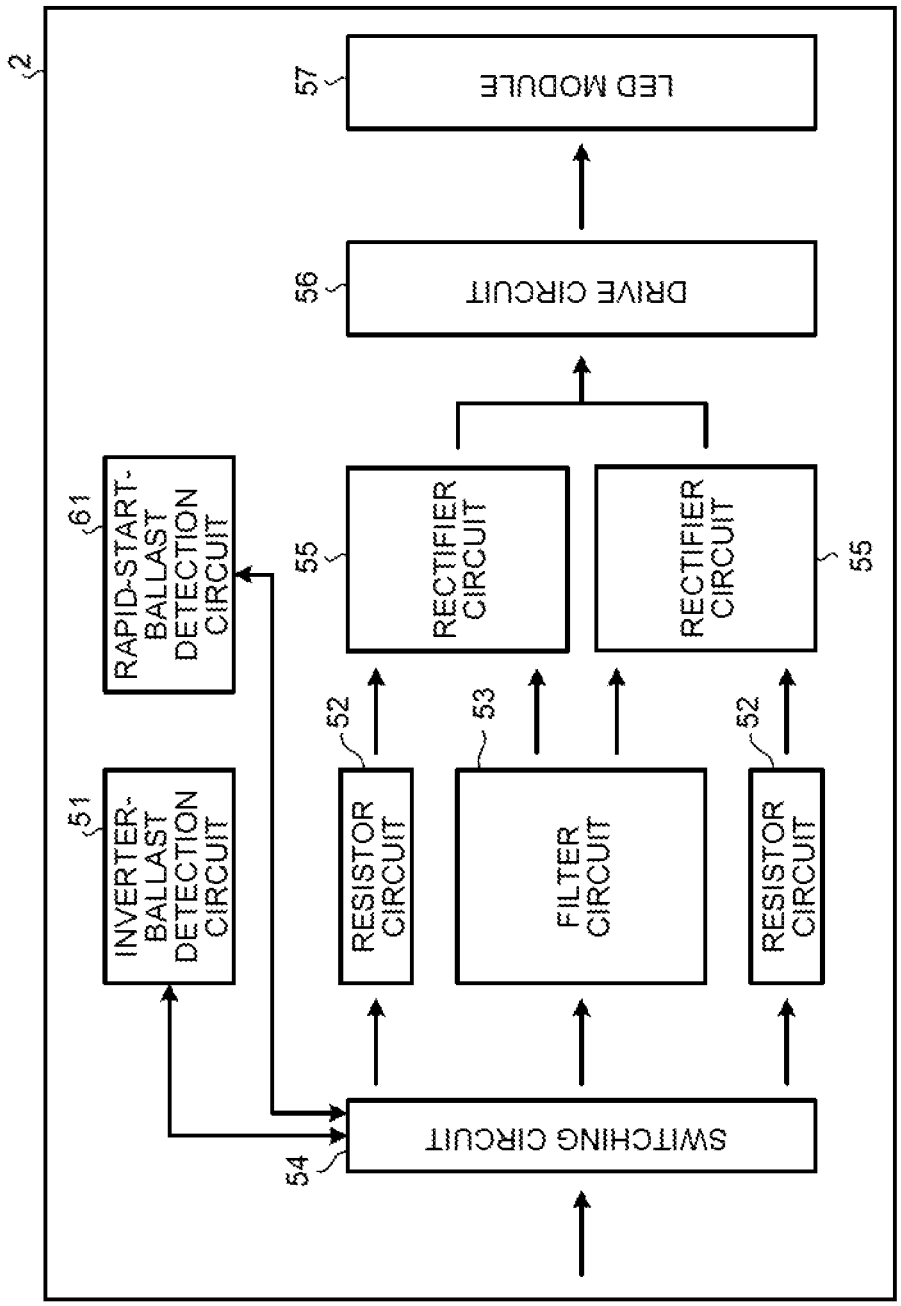
FIG. 11 is a block diagram of a modification of the illumination lamp of the first embodiment, where the illumination lamp includes a rapid-start-ballast detection circuit.

The illumination lamp 100 may be modified to include a rapid-start-ballast detection circuit 61 as illustrated in FIG. 11. The rapid-start-ballast detection circuit 61 detects, when the illumination lamp 100 is energized by being connected to the lamp fixture 150, whether or not the fluorescent-lamp ballast 153 contained in the lamp fixture 150 is a rapid-start fluorescent-lamp ballast. This modification may be configured such that, when the rapid-start-ballast detection circuit 61 detects that the fluorescent-lamp ballast 153 contained in the lamp fixture 150 is a rapid-start fluorescent-lamp ballast, the filter circuit 53 and the drive circuit 56 are not bypassed but specifications of the drive circuit 56 are changed, for example.

Meanwhile, in a case where the inverter-ballast detection circuit 51 does not detect that the fluorescent-lamp ballast 153 is an inverter fluorescent-lamp ballast and, simultaneously, the rapid-start-ballast detection circuit 61 does not detect that the fluorescent-lamp ballast 153 is a rapid-start fluorescent-lamp ballast, it is determined that the fluorescent-lamp ballast 153 is a glow-starter fluorescent-lamp ballast or that the illumination lamp 100 is directly connected to the commercial AC power supply, bypassing the fluorescent-lamp ballast 153. In this case, signals fed to the illumination lamp 100 via the bases are supplied to the rectifier circuits 55 via the filter circuit 53. Outputs of the rectifier circuits 55 are supplied to the LED module 57 via the drive circuit 56. As the specification of the drive circuit 56, specification suitable for the glow-starter fluorescent-lamp ballast and the commercial AC power supply is selected.

Figure 13:
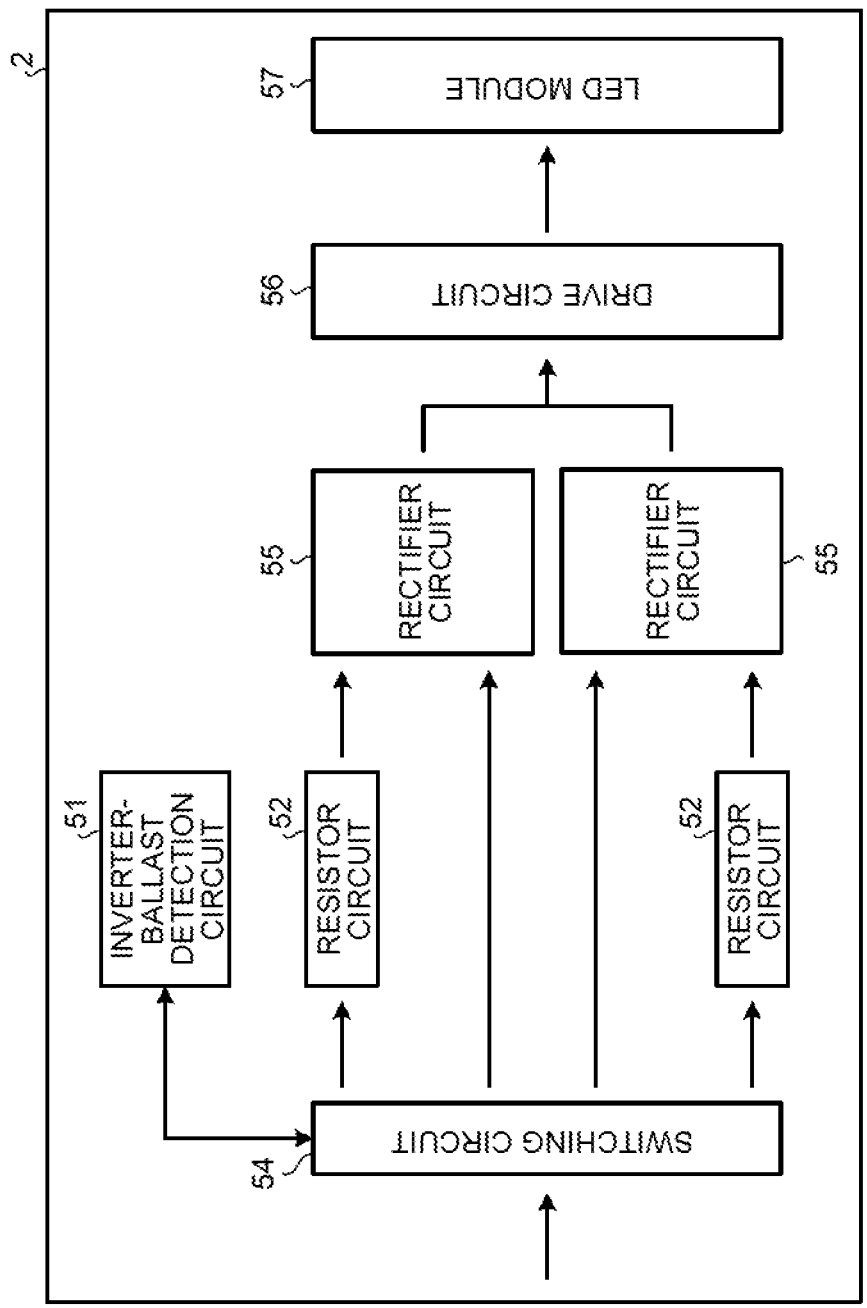
FIG. 13 is a block diagram of a modification of the illumination lamp of the first embodiment, where the illumination lamp does not include the filter circuit.

The illumination lamp 100 may be modified to include neither the high-frequency filter circuits 53b nor the filter circuit 53 as illustrated in FIG. 13.

Figure 12:
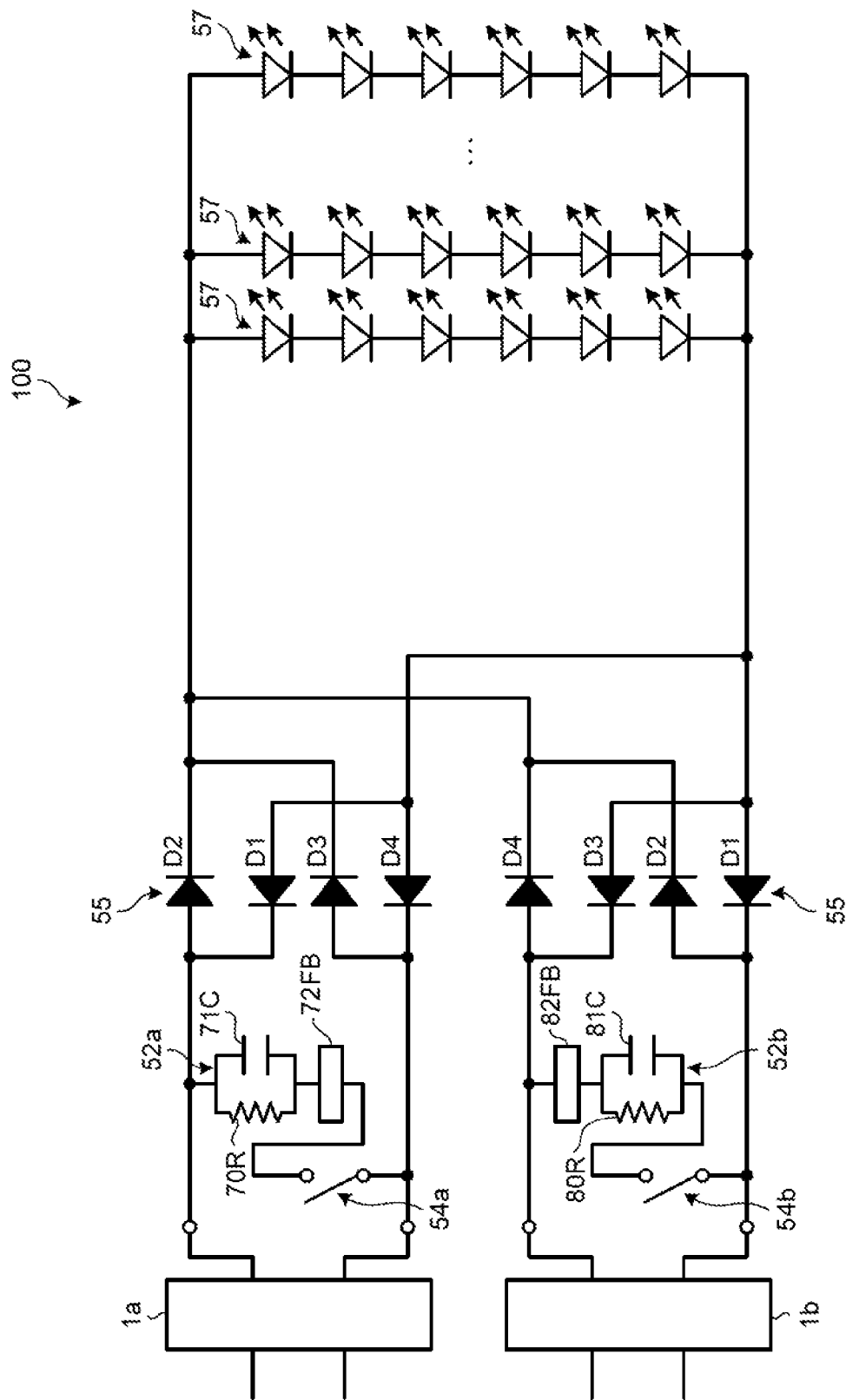
FIG. 12 is a schematic circuit diagram of a first switching circuit, a second switching circuit, a first resistor circuit, and a second resistor circuit contained in the illumination lamp of the first embodiment.

FIG. 12 is a schematic circuit diagram of the switching circuits 54 and the resistor circuits 52 disposed in the illumination lamp 100. As illustrated in FIG. 12, the switching circuits 54 include a first switching circuit 54a and a second switching circuit 54b; the resistor circuits 52 include a first resistor circuit 52a and a second resistor circuit 52b. As illustrated in FIG. 12, the first resistor circuit 52a is formed by parallel-connecting a resistor 70R and a capacitor 71C that create an impedance corresponding to a filament of an existing fluorescent lamp. One end connections of the resistor 70R and the capacitor 71C are connected to the power supply wire. The other end connections of the resistor 70R and the capacitor 71C are connected to one end of the first switching circuit 54a that is connected at the other end to the power supply wire.

In short, the first resistor circuit 52a where the resistor 70R and the capacitor 71C are parallel-connected is series-connected to the first switching circuit 54a. The one terminal, which is on the side opposite from the other terminal where the first resistor circuit 52a is connected to the first switching circuit 54a, of the first resistor circuit 52a is connected to the power supply wire. The one terminal, which is on the side opposite from the other terminal where the first switching circuit 54a is connected to the first resistor circuit 52a, of the first switching circuit 54a is connected to the power supply wire.

A ferrite bead 72FB, which is an example of inductor, is interposed between and connected to the first resistor circuit 52a and the first switching circuit 54a. Other inductor, such as a coil, may be used in lieu of the ferrite bead. The inductor such as the ferrite bead or the coil is an example of a noise reduction portion.

Similarly, the second resistor circuit 52b where a resistor 80R and a capacitor 81C are parallel-connected is series-connected to the second switching circuit 54b. One terminal, which is on the side opposite from the other terminal where the second resistor circuit 52b is connected to the second switching circuit 54b, of the second resistor circuit 52b is connected to the power supply wire. One terminal, which is on the side opposite from the other terminal where the second switching circuit 54b is connected to the second resistor circuit 52b, of the second switching circuit 54b is connected to the power supply wire.

A ferrite bead 82FB, which is an example of inductor, is interposed between and connected to the second resistor circuit 52b and the second switching circuit 54b. Other inductor, such as a coil, may be used in lieu of the ferrite bead.

The first switching circuit 54a and the second switching circuit 54b are a so-called two-conductor relay circuit. When the illumination lamp 100 is mounted in a lamp fixture where the fluorescent-lamp ballast 153 is any one of a glow-starter fluorescent-lamp ballast, a rapid-start fluorescent-lamp ballast, and the commercial AC power supply, the first switching circuit 54a and the second switching circuit 54b perform a switch-off operation. The switch-off operation performed respectively by the first switching circuit 54a and the second switching circuit 54b disconnects the first resistor circuit 52a and the second resistor circuit 52b from the power supply wire. Hence, when the illumination lamp 100 is mounted in a lamp fixture where the fluorescent-lamp ballast 153 is any one of a glow-starter fluorescent-lamp ballast, a rapid-start fluorescent-lamp ballast, and the commercial AC power supply, power supply to the first resistor circuit 52a and the second resistor circuit 52b each corresponding to a filament is cut off, thereby preventing undesirable waste of electric power.

For example, each of the first switching circuit 54a and the second switching circuit 54b may include a first contact connected to a corresponding one of the first resistor circuit 52a and the second resistor circuit 52b and a second contact connected to the filter circuit 53. The first switching circuit 54a and the second switching circuit 54b form what may be referred to as the two-conductor relay circuit. When the illumination lamp 100 is mounted in a lamp fixture where the fluorescent-lamp ballast 153 is any one of a glow-starter fluorescent-lamp ballast, a rapid-start fluorescent-lamp ballast, and the commercial AC power supply, the first contacts are switched off and the second contacts are switched on by electromagnets energized by electric currents flowing through coils. When the second contacts of the first switching circuit 54a and the second switching circuit 54b are respectively switched on, the filter circuit 53 illustrated in FIG. 6 is connected to the power supply wire. The filter circuit 53 removes high-frequency noise superimposed on the AC power supply. Accordingly, the LED module 57 can be lit up stably by power supply from which noise is removed by the rectifier circuits 55 and the drive circuit 56.

In the example described above, the first resistor circuit 52a and the second resistor circuit 52b are disconnected from the power supply wire using the respective switches which are the first switching circuit 54a and the second switching circuit 54b. Alternatively, the first resistor circuit 52a and the second resistor circuit 52b may be disconnected from the power supply wire using thermal fuses or the like in lieu of the switches.

When the illumination lamp 100 is mounted in an inverter-type lamp fixture, the first switching circuit 54a and the second switching circuit 54b that form the two-conductor relay circuit perform a switch-on operation. The switch-on operation respectively performed by the first switching circuit 54a and the second switching circuit 54b connects the first resistor circuit 52a and the second resistor circuit 52b to the power supply wire.

As described earlier, in the configuration where each of the first switching circuit 54a and the second switching circuit 54b includes the first contact connected to a corresponding one of the first resistor circuit 52a and the second resistor circuit 52b and the second contact connected to the filter circuit 53, when the illumination lamp 100 is mounted in an inverter-type lamp fixture, the first contacts are switched on and the second contacts are switched off because electric currents do not flow through the coils. When the second contacts of the first switching circuit 54a and the second switching circuit 54b are respectively switched off, the filter circuit 53 illustrated in FIG. 6 is disconnected from the power supply wire. When the first contacts of the first switching circuit 54a and the second switching circuit 54b are switched on, the first resistor circuit 52a and the second resistor circuit 52b are connected to the power supply wire.

The inverter-ballast detection circuit 51 illustrated in FIG. 6 detects that the illumination lamp 100 is mounted in an inverter-type lamp fixture. With the detection as the trigger, the power-saving switching circuit 60 drives the LED module 57 to light up in compliance with the inverter method. Because the first resistor circuit 52a and the second resistor circuit 52b each corresponding to a filament of a fluorescent lamp are connected to the power supply wire, an undesirable situation that a protection circuit of the inverter fluorescent-lamp ballast works to stop supplying output power can be prevented. Output power can thus be supplied stably from the inverter fluorescent-lamp ballast by causing the first resistor circuit 52a and the second resistor circuit 52b to act as substitutes for filaments, and the LED module 57 can be driven stably.

Meanwhile, as described earlier, the ferrite bead 72FB and the ferrite bead 82FB are interposed between and connected to the first resistor circuit 52a and the first switching circuit 54a, and between the second resistor circuit 52b and the second switching circuit 54b, respectively. Each of the ferrite beads 72FB and 82FB removes high-frequency noise superimposed on the AC power supply or radiation noise radiated from other line(s) or other circuit(s) when the illumination lamp 100 is driven to light up in compliance with inverter method.

In the case of an LED illumination device that does not require rewiring, circuits need to be accommodated in the illumination lamp 100. To satisfy this need, LED driver boards generally have layouts where many signal wires are thin and circuit patterns are arranged at small intervals. Furthermore, the need of laying long wire harnesses in the illumination lamp 100 arises. Such a layout can cause a large number of high-frequency noises or radiation noises to be superimposed on the power supply wires. As a result, an undesirable situation that the illumination lamp 100 fails to light up once every ten times, for example, can occur.

However, in the illumination lamp 100 of the first embodiment, when the illumination lamp 100 is mounted in an inverter-type lamp fixture, the ferrite bead 72FB interposed between and connected to the first resistor circuit 52a and the first switching circuit 54a or the ferrite bead 82FB interposed between and connected to the second resistor circuit 52b and the second switching circuit 54b works. More specifically, the ferrite bead 72FB and the ferrite bead 82FB remove high-frequency noises or radiation noises superimposed on the power supply wires. As a result, because the inverter fluorescent-lamp ballast can operate stably, the illumination lamp 100 can light up substantially stably without failing to emit light. Hence, the illumination lamp 100 of the first embodiment can light up stably while increasing the light-on ratio when the illumination lamp 100 is mounted in an inverter-type lamp fixture.

Meanwhile, because a ferrite bead also functions as an inductor, the ferrite beads may be used for fine adjustment of the impedances of the first resistor circuit 52a and the second resistor circuit 52b.

In the above description, when the illumination lamp 100 is mounted in a lamp fixture where the fluorescent-lamp ballast 153 is any one of a glow-starter fluorescent-lamp ballast, a rapid-start fluorescent-lamp ballast, and the commercial AC power supply, the first switching circuit 54a and the second switching circuit 54b cut off power supply to the first resistor circuit 52a and the second resistor circuit 52b. Alternatively, the illumination lamp 100 may be configured to disconnect one of the first resistor circuit 52a and the second resistor circuit 52b.

Semi-resonant rapid-start fluorescent-lamp ballasts (hereinafter, "resonant rapid-start fluorescent-lamp ballasts") that use a combination of a coil and a capacitor to preheat an electrode with an electric current charging the capacitor and light up a fluorescent lamp by applying a high voltage obtained by LC resonance are known. If the illumination lamp 100 is mounted in a lamp fixture including such a resonant rapid-start fluorescent-lamp ballast, an electric current flows in the following loop: the resonant rapid-start fluorescent-lamp ballast, the first resistor circuit 52a, the resonant rapid-start fluorescent-lamp ballast, the second resistor circuit 52b, and the resonant rapid-start fluorescent-lamp ballast. This loop can inhibit the illumination lamp 100 from being driven to light up stably. However, the illumination lamp 100 of the first embodiment can prevent the above-described loop that would otherwise be formed when a resonant rapid-start fluorescent-lamp ballast is used by disconnecting at least one of the first resistor circuit 52a and the second resistor circuit 52b from the power supply wire using the first switching circuit 54a and/or the second switching circuit 54b.

As is apparent from the above description, the illumination lamp 100 of the first embodiment includes the first resistor circuit 52a and the second resistor circuit 52b, each corresponding to a filament, and the first switching circuit 54a and the second switching circuit 54b that respectively connect or disconnect the resistor circuits 52a and 52b to or from the power supply wire. The first switching circuit 54a and the second switching circuit 54b connect the first resistor circuit 52a and the second resistor circuit 52b to the power supply wire only when the illumination lamp 100 is mounted in an inverter-type lamp fixture. The first switching circuit 54a and the second switching circuit 54b disconnect the first resistor circuit 52a and the second resistor circuit 52b from the power supply wire when the illumination lamp 100 is mounted in a lamp fixture of a type other than the inverter type. Accordingly, an undesirable situation that electric power is wasted by being supplied to the first resistor circuit 52a and the second resistor circuit 52b which are unnecessary when the illumination lamp 100 is mounted in a lamp fixture of a type other than the inverter type can be prevented. As a result, reduction in power consumption of the illumination lamp 100 can be achieved.

Furthermore, the illumination lamp 100 of the first embodiment includes the ferrite bead 72FB between the first resistor circuit 52a and the first switching circuit 54a or the ferrite bead 82FB between the second resistor circuit 52b and the second switching circuit 54b. Each of the ferrite beads 72FB and 82FB works when the illumination lamp 100 is mounted in an inverter-type lamp fixture to remove high-frequency noises or radiation noises superimposed on the power supply wire. As a result, because the inverter fluorescent-lamp ballast can operate stably, the illumination lamp 100 can light up substantially stably without failing to emit light. Hence, the illumination lamp 100 of the first embodiment can light up stably with an increased light-on ratio when the illumination lamp 100 is mounted in an inverter-type lamp fixture.

Second Embodiment

An illumination lamp according to a second embodiment is described below. The first embodiment has been described through the example in which only the single illumination lamp 100 is mounted in a single-lamp lamp fixture. In contrast to this, the illumination lamp of the second embodiment is configured so that, when a plurality of the illumination lamps 100 are simultaneously mounted in a multiple-lamp lamp fixture containing a rapid-start fluorescent-lamp ballast, the plurality of illumination lamps 100 mounted in the multiple-lamp lamp fixture can light up with more equal light output intensities.

Figure 14:
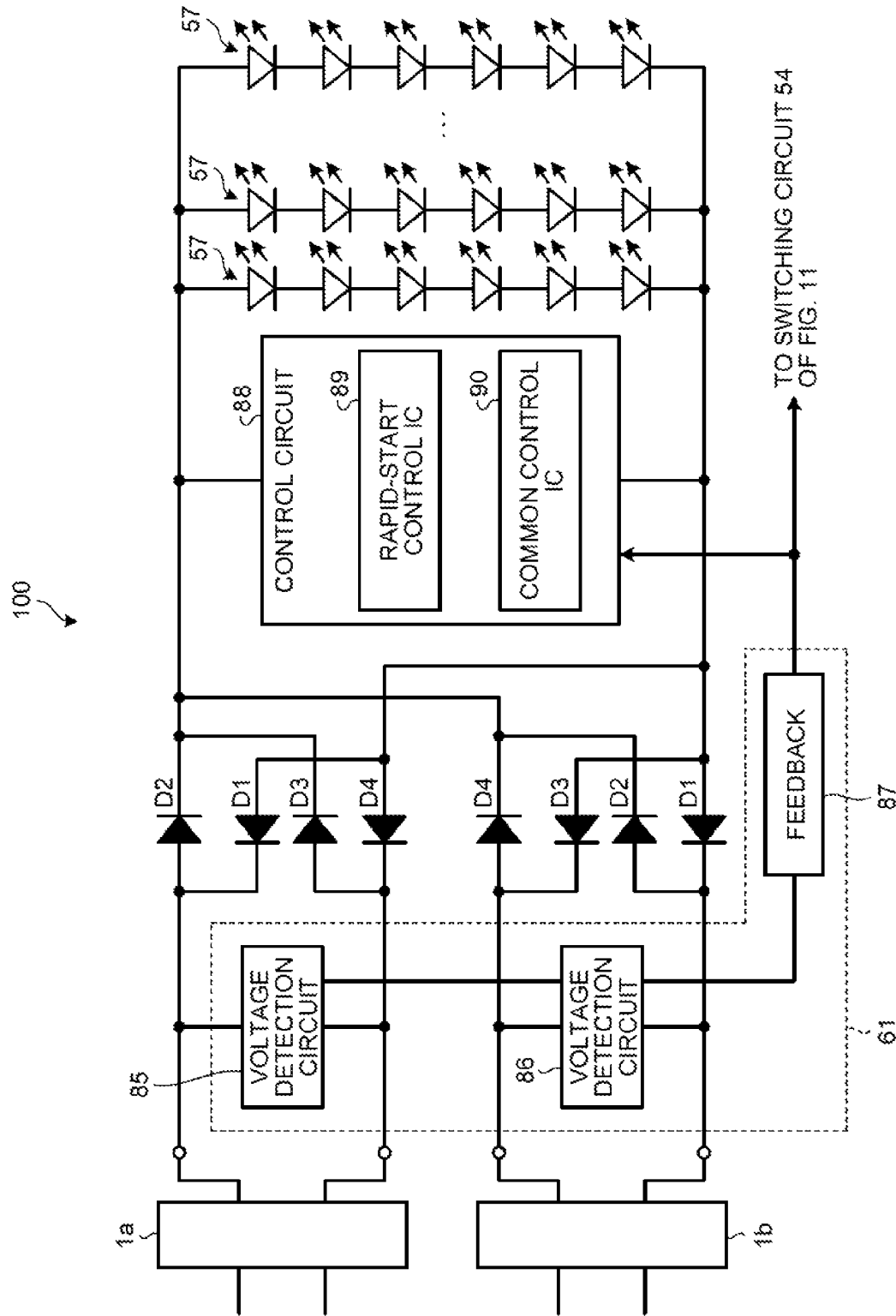
FIG. 14 is a block diagram of an illumination lamp of a second embodiment.

FIG. 14 is a block diagram of the illumination lamp 100 of the second embodiment. FIG. 14 illustrates an example in which the two illumination lamps 100 are simultaneously mounted in a dual-lamp lamp fixture. Power supply from a ballast contained in the lamp fixture or a direct AC power supply is supplied to a base 1a and to a base 1b of each of the illumination lamps 100. Each of the illumination lamps 100 includes voltage detection circuits 85 and 86 for detecting the voltage of the supplied power supply. The illumination lamp 100 of the second embodiment includes a feedback circuit 87 for feeding back a voltage detection output of the voltage detection circuits 85 and 86. The voltage detection circuits 85 and 86 and the feedback circuit 87 correspond to the rapid-start-ballast detection circuit 61 illustrated in FIG. 11. In this example, each of the illumination lamps 100 includes the voltage detection circuits 85 and 86. Alternatively, only one of the illumination lamps 100 may include the voltage detection circuits.

A control circuit 88, which is illustrated in FIG. 14, corresponds to the above-described drive circuit 56. For example, as illustrated in FIG. 14, the control circuit 88 may include a rapid-start control IC 89, which is dedicated to rapid-start ballasts, and a common control IC 90. IC is an abbreviation for integrated circuit. The rapid-start control IC 89 and the common control IC 90 correspond to the above-described drive circuit 56. The common control IC 90 is a common drive circuit that drives the illumination lamps 100 to light up when the illumination lamps 100 are mounted in an AC-direct-connect-type lamp fixture or a lamp fixture containing a glow-starter ballast. The control circuit 88 selects any one of the control ICs 89 and 90 using the voltage detection output fed back from the feedback circuit 87. The control circuit 88 drives the LED module 57 to light up using the selected control IC.

More specifically, the voltage detection circuits 85 and 86 detect the voltage of power supplied to the base 1a and the base 1b of each of the illumination lamps 100. When power supply is directly supplied from the AC power supply to each of the illumination lamps 100, or when power supply is supplied from a glow-starter ballast, the voltage detection circuits 85 and 86 detect no voltage. Although in a case where power is directly supplied from the AC power supply, the voltage may be detectable depending on wiring, generally, the voltage detection circuits 85 and 86 detect no voltage.

The feedback circuit 87 performs binarization of the voltage detection output of the voltage detection circuits 85 and 86 by comparing the voltage detection output against a predetermined threshold, and feeds the thus-obtained binary value to a feedback terminal of the control circuit 88. For example, when the voltage of the power supply supplied to the base 1a and the base 1b of each of the illumination lamps 100 is detected, a voltage detection output "1 (a high level)" is fed from the feedback circuit 87 to the control circuit 88. When no voltage of the power supply supplied to the base 1a and the base 1b of each of the illumination lamps 100 is detected, a voltage detection output "0 (a low level)" is fed from the feedback circuit 87 to the control circuit 88. Meanwhile, the feedback circuit 87 feeds the voltage detection output not only to the control circuit 88 but also to the switching circuits 54 illustrated in FIG. 11. The voltage detection output is used in the switching operation of the switching circuits 54 described above.

If the fed-back voltage detection output is "0 (low level)", the control circuit 88 selects the common control IC 90. Accordingly, when power supply is directly supplied from the AC power supply to each of the illumination lamps 100, or when power supply is supplied from a glow-starter ballast, the LED module 57 is driven to light up using the common control IC 90.

On the other hand, if the fed-back voltage detection output is "1 (high level)", the control circuit 88 selects the rapid-start control IC 89. Accordingly, when power supply is supplied from a rapid-start ballast to each of the illumination lamps 100, the LED module 57 is driven to light up using the rapid-start control IC 89.

As described above, when power supply is supplied from a rapid-start ballast, the illumination lamp 100 of the second embodiment detects the voltage across the base 1a and the base 1b, and drives the LED module 57 to light up using the rapid-start control IC 89. Hence, the LED module 57 can be driven to light up using the drive circuit dedicated to rapid-start ballasts. Accordingly, even if the plurality of illumination lamps 100 are mounted in a multiple-lamp lamp fixture, the illumination lamps 100 can light up with more equal light output intensities. Furthermore, advantages similar to those provided by the abovementioned embodiment can be obtained.

Third Embodiment

An illumination lamp according to a third embodiment of the present invention is described below. The illumination lamp of the second embodiment allows the plurality of illumination lamps 100 mounted in a multiple-lamp lamp fixture to light up with more equal light output intensities by using the drive circuit dedicated to rapid-start ballasts. In contrast thereto, the illumination lamp of the third embodiment allows the plurality of illumination lamps 100 mounted in a multiple-lamp lamp fixture to light up with more equal light output intensities by forcibly fixing an ON period of switching operation of the drive circuit dedicated to rapid-start ballasts to a predetermined ON period, thereby causing an equal amount of electric current to flow through the plurality of illumination lamps 100 mounted in the multiple-lamp lamp fixture.

Generally, a control IC that drives the LED module 57 to light up compares a predetermined sawtooth wave against a predetermined voltage and generates a drive pulse of the LED module 57 by performing the switching operation in which ON operation is performed during when the given sawtooth wave is equal to or higher than the predetermined voltage. However, if the period in which the control IC performs the ON operation varies due to fluctuation in the direct-current level or the like, voltages applied to the illumination lamps 100 mounted in a series-dual-lamp-type lamp fixture containing a rapid-start ballast, for example, can become unbalanced such that while 120 V is applied to one of the illumination lamps 100, only 20 V is applied to the other illumination lamp 100. If the applied voltages become unbalanced in this manner, an undesirable situation that a large amount of electric current flows to one of the illumination lamps 100, while only a small amount of electric current flows to the other illumination lamp 100, making the illumination lamps unbalanced in light output intensity occurs.

To avoid such an undesirable situation, in the illumination lamp 100 of the third embodiment, a switching control element is connected to the rapid-start control IC 89 as illustrated in the block diagram of FIG. 15. Note that the common control IC 90 is omitted from FIG. 15. As the switching control element, a Zener diode, a resistor, a capacitor, or the like can be connected. FIG. 15 illustrates an example in which a Zener diode 93 is connected as the switching control element. When the Zener diode 93 is connected, the anode (A) is to be connected to a ground line; the cathode (C) is to be connected to a terminal, such an error amplifier terminal, of the rapid-start control IC 89 where a feedback is obtained.

The rapid-start control IC 89 generally controls the switching operation based on feedback of an input voltage or an output current. However, in the illumination lamp 100 of the third embodiment, the rapid-start control IC 89 controls the switching operation differently from such general control. More specifically, in the illumination lamp 100 of the third embodiment, the ON period of the switching operation of the rapid-start control IC 89 is forcibly fixed using the Zener diode 93. Put another way, in the illumination lamp 100 of the third embodiment, the Zener diode 93 controls the ON operation periods in the switching operations of the rapid-start control ICs 89 such that periods in which the ON operations are preformed are the same.

Thus, even if voltages applied to the illumination lamps 100 mounted in a series-dual-lamp-type lamp fixture containing a rapid-start ballast, for example, are unbalanced, the above-described control can gradually make the voltages applied to the illumination lamps 100 equal to each other. By performing the control that makes the same voltage be applied to the illumination lamps 100, the amount of electric current flowing through the illumination lamps 100 can also be equalized. As a result, the illumination lamps 100 can be made more equal in light output intensity. An experiment carried out by the applicant using a prototype indicates that even if voltages applied to the illumination lamps 100 are unbalanced, the voltages applied to the illumination lamps 100 can be equalized, thereby equalizing light output intensities of the illumination lamps 100 within approximately several milliseconds.

As described above, in the illumination lamp 100 of the third embodiment, the switching control element is connected to the rapid-start control IC 89 to forcibly fix the ON period of the switching operation. Because the voltages applied to the illumination lamps 100 become equal, the illumination lamps 100 become equal in light output intensity. Furthermore, advantages similar to those provided by the abovementioned embodiments can be obtained.

According to an aspect of the present invention, a plurality of semiconductor light-emitting devices mounted in a rapid-start-ballast lamp fixture can light up with more equal light output intensities.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination lamp comprising:
   an input portion connectable to any one of power supply portions for two or more starting methods including a method using a fluorescent-lamp ballast for a rapid-start method;
   a semiconductor light-emitting device;
   a voltage detection circuit configured to detect a voltage applied from a power supply portion; and
   a control portion including
   at least one first voltage supply portion for the rapid-start method, the first voltage supply portion being configured to supply a voltage suitable for the rapid-start method to the semiconductor light-emitting device, and
   at least one second voltage supply portion configured to supply a voltage suitable for another fluorescent-lamp starting method to the semiconductor light-emitting device,
   the control portion causing, if the voltage is detected by the voltage detection circuit, the first voltage supply portion to supply the voltage suitable for the rapid-start method to the semiconductor light-emitting device, but causing, if the voltage is not detected by the voltage detection circuit, the second voltage supply portion to supply the voltage suitable for said another fluorescent-lamp starting method to the semiconductor light-emitting device,
   wherein when power supply is supplied from another power supply portion for said another fluorescent-lamp starting method, the voltage detection circuit does not detect voltage.

2. An illumination device comprising:
   the illumination lamp according to claim 1; and
   a lamp fixture in which the illumination lamp is to be mounted.

3. An illumination lamp comprising:
   an input portion connectable to a power supply portion of a fluorescent-lamp ballast for a rapid-start method;
   a semiconductor light-emitting device;
   a control portion including at least one voltage supply portion for the rapid-start method, the voltage supply portion being configured to supply a voltage suitable for the rapid-start method, the control portion generating a voltage to be supplied by the voltage supply portion to the semiconductor light-emitting device by a switching operation in which the voltage corresponding to a predetermined ON period of the voltage supply portion is generated; and
   a switching control element configured to control the predetermined ON period in the switching operation of the voltage supply portion.

4. The illumination lamp according to claim 3, wherein the switching control element fixes the ON period of the voltage supply portion to a fixed period.

5. The illumination lamp according to claim 3, wherein the switching control element is any one of a Zener diode, a resistor, and a capacitor.

6. An illumination device comprising:
   the illumination lamp according to claim 3; and
   a lamp fixture in which the illumination lamp is to be mounted.

* * * * *